C. HAMMER.
ANIMAL CLEANING APPARATUS.
APPLICATION FILED FEB. 6, 1908.
908,991.
Patented Jan. 5, 1909.
2 SHEETS—SHEET 1.
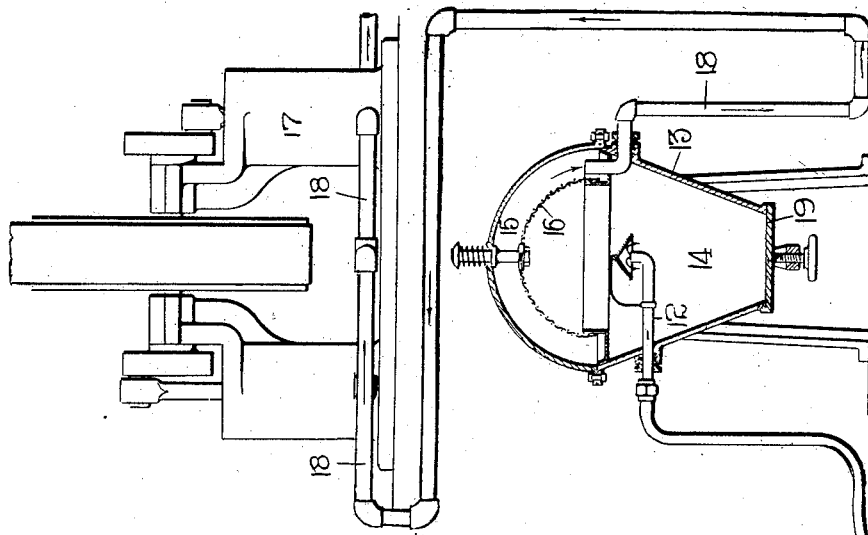
Fig. 1.
Witnesses.
Conrad Hammer Inventor.
Attorney.

C. HAMMER.
ANIMAL CLEANING APPARATUS.
APPLICATION FILED FEB. 6, 1908.
908,991.
Patented Jan. 5, 1909.
2 SHEETS—SHEET 2.
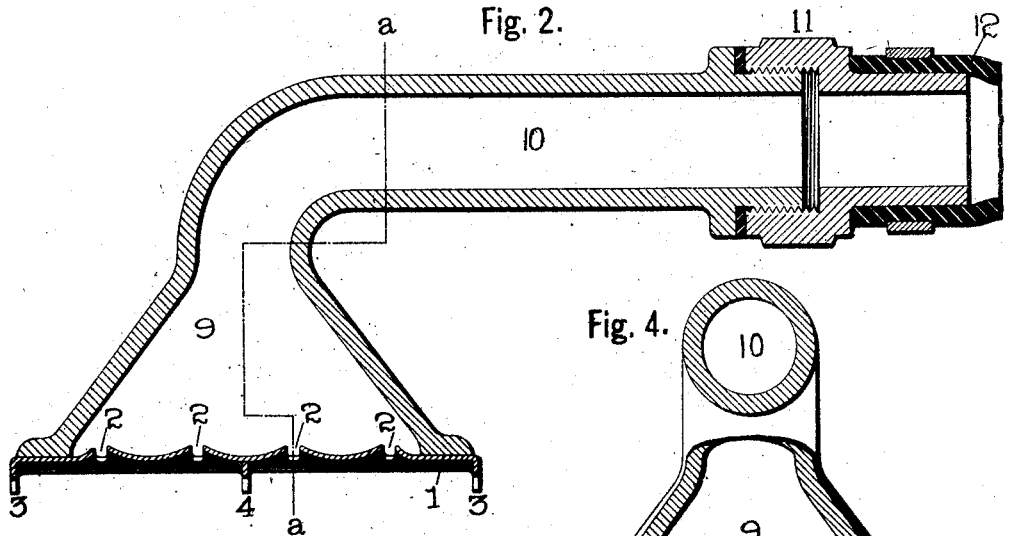
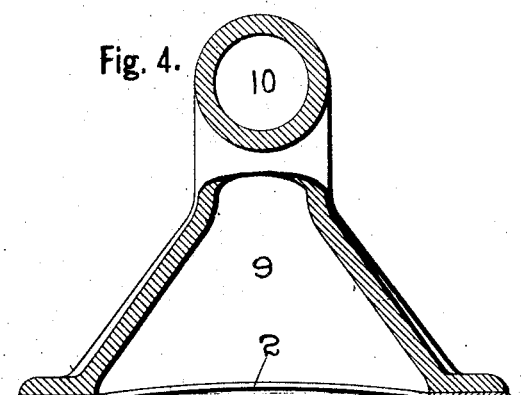
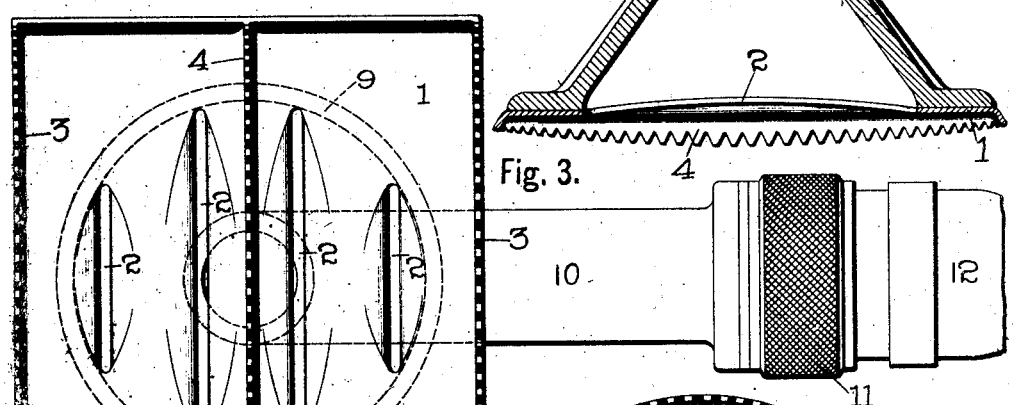
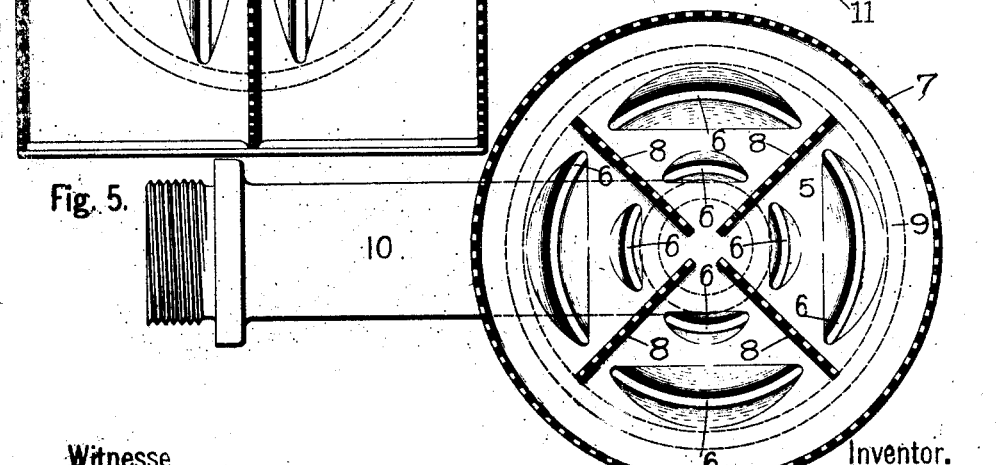
Witnesse
Inventor.
Conrad Hammer
Attorney.

UNITED STATES PATENT OFFICE.

CONRAD HAMMER, OF BUFFALO, NEW YORK.

ANIMAL-CLEANING APPARATUS.

No. 908,991.  Specification of Letters Patent.  Patented Jan. 5, 1909.

Application filed February 6, 1908. Serial No. 414,516.

*To all whom it may concern:*

Be it known that I, CONRAD HAMMER, a citizen of the United States, residing at Buffalo, in the county of Erie and State of New York, have invented a certain new and useful Improved Animal-Cleaning Apparatus, of which the following is a specification.

This invention relates to an improved animal cleaning apparatus and comprises a scraping device and a suction mechanism connected to the scraping device.

The object of the invention is to provide an automatic suction mechanism to be utilized in conjunction with a scraping tool to remove the dirt, dust and hair as it is loosened upon the animal's hide by the scraping tool, and to so construct the scraping tool that the suction action is divided and operates through a series of openings to prevent the raising of blisters in the animal's skin.

The invention also relates to certain details of construction all of which will be fully and clearly hereinafter described and claimed, reference being had to the accompanying drawings in which,—

Figure 1 is a general view showing the improved animal cleaning apparatus in operation, a central vertical section being shown through a portion thereof to disclose the interior construction and the pipe connections between the suction pump and vacuum tank being omitted. Fig. 2 is a detached central longitudinal section through the scraping device of the apparatus. Fig. 3 is a bottom plan view of the same. Fig. 4 is a vertical transverse section on line *a a*, Fig. 1. Fig. 5 is a detached bottom view of the scraping device, showing the serrated scraping flanges arranged in another manner.

In referring to the drawings in detail like numerals designate like parts.

This improved apparatus comprises a scraping device and a suction mechanism connected directly by flexible tubing to the scraping device.

The scraping device is preferably of that type known as a curry comb, having a base plate provided with elongated slots and serrated or toothed scraping flanges.

The curry comb may be made in many shapes of which two are illustrated in the accompanying drawings.

In Figs. 2, 3 and 4, a curry comb of square form is shown having a base plate 1, of square outline provided with a series of straight slots 2, two side flanges 3, and a center flange 4. The center and side flanges preferably extend straight and parallel with the slots and are serrated or toothed on their lower edges to provide means having a plurality of projections for scraping the surface of an animal.

In the form shown in Fig. 5, the base plate 5, is of circular form and the slots 6, are curved and concentric.

An outer serrated or toothed flange 7, extends at approximately right angles from the outer marginal edge of the circular plate 5, and a series of inner serrated or toothed flanges 8, radiate at equal distances apart from separated points near the center of the plate and extend between the ends of the curved slots 6.

It is to be noted that the metal at the margins of the slots is bent or curved upwardly so that the slots flare inwardly from the scraping side of the curry comb.

A tubular nozzle has its bell shaped or enlarged outer end 9, fastened to the top surface of the base plate of the scraping device and enlarged sufficiently to inclose all of the slots in the base plate as shown in Fig. 2.

The tubular portion 10 of the nozzle above the bell shaped end 9 is bent to provide a convenient hand grasping part for the operator in manipulating the curry comb as shown in Fig. 2, and is joined by a screw coupling 11 to one end of a rubber or other flexible tubing 12.

The slotted base plate which is attached to the infundibular end of the nozzle forms a hollow enlargement or bulb at the end of the flexible tubing which constitutes a vacuum chamber.

The object in slotting the base plate is to provide suction openings that are large enough to draw the hair and dirt through into the chamber, are sufficiently small to prevent the raising of blisters on the skin of the animal.

In operation the base plate is kept as close as possible to the animal's skin in order to maintain a constant vacuum with but a fair amount of pumping suction and thus reduce the power required to the minimum.

Now referring to Fig. 1 the opposite end of the tubing is connected to what is known as a vacuum tank.

The form of tank illustrated in Fig. 1 consists of an air tight receptacle 13 which is divided into two compartments 14 and 15 by a flexible diaphragm 16 preferably of woven ducking which is sufficiently porous to permit the passage of air and at the same time in a large degree prevent the passage of dust, dirt or hair.

The tubing 12 connects to the lower portion of the tank so as to be in direct communication with the lower compartment 14 of the tank and a suction pump 17 is connected by a pipe 18 to the upper portion of the tank and communicates directly with the upper compartment 15.

In Fig. 1 a portion of the pipe 18 is shown extending from the vacuum tank and another portion from the suction pump and the connecting portion between the two end portions is omitted for lack of space.

The tank 13 is provided with a bottom cover 19 which is removed when it is desired to clean out the tank.

The operation of this improved apparatus will be readily understood by referring to Fig. 1 of the drawings.

The operator grasping the bent portion of the device applies the scraping portion to the animal's skin and moves it so as to loosen or dislodge the dirt dust or hair which is immediately drawn by suction through the slots of the base plate and the nozzle and conducting tube into the lower compartment of the vacuum tank.

The advantages of this improved apparatus are in its perfect cleanliness of operation, all the dust which is raised by an ordinary curry comb being drawn off by suction through the slots in this improved device, its simplicity and cheapness of construction and the rapidity and thoroughness with which it can be operated, the comparatively low power required as the infundibular end of the nozzle is nearly closed by the base plate, the only openings being the small slots in the base plate, and the fact that blisters cannot be raised in the animal's skin owing to separation of the suction action into a series of narrow spaces.

I claim—

1. An apparatus of the class described, comprising an animal scraping device having a tubular handle, a slotted base closing the outer end of the tubular handle and scraping flanges extending from the slotted base plate, suction mechanism and flexible tubing connecting the suction mechanism to the tubular handle.

2. An apparatus of the class described, comprising an animal scraping device having an enlarged chamber and a slotted base plate closing the outer end of the enlarged chamber and provided with scraping flanges, suction mechanism and flexible tubing connected at one end to the suction mechanism and having an enlarged nozzle at the opposite end connected to the slotted base plate of the scraping device.

3. An apparatus of the class described, comprising an animal scraping device having a tubular handle and a hollow enlargement at the outer end of the handle provided with a slotted plate with scraping projections extending from said plate, a suction pump, a vacuum tank, flexible tubing connecting the vacuum tank to the tubular handle and tubing connecting the vacuum tank to the suction pump.

4. The combination with suction mechanism of a currying device consisting of a hollow bulb connected to the suction mechanism and a base plate closing the outer end of the hollow bulb and provided with narrow slots forming suction openings and scraping flanges extending from the base plate and located between the slots.

5. In an apparatus of the class described, an animal scraping device having a tubular body and a base plate closing the outer end of the tubular body; said base plate being provided with perforations which are sufficiently large to permit the passage of hair and dirt into the tubular body and sufficiently small to prevent the raising of blisters by suction on the skin of an animal, and scraping flanges extending therefrom in combination with suction mechanism and tubular means connecting the suction mechanism to the tubular body.

CONRAD HAMMER

Witnesses:
L. M. SANGSTER,
GEORGE A. NEUBAUER.